United States Patent
Kang et al.

(10) Patent No.: US 10,846,035 B2
(45) Date of Patent: Nov. 24, 2020

(54) METHOD FOR CONTROLLING IMAGE FORMING APPARATUS AND IMAGE FORMING APPARATUS USING SAME

(71) Applicant: Hewlett-Packard Development Company, L.P., Spring, TX (US)

(72) Inventors: Su-young Kang, Seongnam-si (KR); Yoon-soo Lee, Seongnam-si (KR); Hosung Han, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/683,909

(22) Filed: Nov. 14, 2019

(65) Prior Publication Data

US 2020/0081672 A1 Mar. 12, 2020

Related U.S. Application Data (63) Continuation of application No. PCT/KR2017/007034, filed on Jul. 3, 2017.

(30) Foreign Application Priority Data

May 18, 2017 (KR) .................. 10-2017-0061643

(51) Int. Cl.
    *G06F 3/12* (2006.01)
    *H04N 1/00* (2006.01)
    *G06K 15/02* (2006.01)

(52) U.S. Cl.
    CPC .......... *G06F 3/1255* (2013.01); *G06F 3/1238* (2013.01); *G06F 3/1292* (2013.01)

(58) Field of Classification Search
    None
    See application file for complete search history.

(56) References Cited

U.S. PATENT DOCUMENTS

| | | | |
|---|---|---|---|
| 7,532,341 B2 * | 5/2009 | Itoh ................... | H04N 1/32144 358/1.15 |
| 10,048,916 B1 * | 8/2018 | Polackal ................ | G06F 3/127 |
| 2005/0146755 A1 * | 7/2005 | Shimokawa ....... | H04N 1/00416 358/453 |

(Continued)

FOREIGN PATENT DOCUMENTS

| | | |
|---|---|---|
| JP | 2005-167988 A | 6/2005 |
| JP | 2007-140662 A | 6/2007 |

(Continued)

*Primary Examiner* — Beniyam Menberu
(74) *Attorney, Agent, or Firm* — Jefferson IP Law, LLP (57) ABSTRACT

An image forming apparatus and a method to normally execute an application using a function, which is not supported by the image forming apparatus, on the image forming apparatus are provided. An example image forming apparatus includes a user interface device to receive an execution request of an application using a first function and replace an execution request of the first function according to the execution request of the application with an execution request of a second function corresponding to the first function, a controller to generate an execution command of the second function according to the execution request of the second function, and a second function unit to execute the second function according to the execution command.

16 Claims, 9 Drawing Sheets

(56) References Cited

U.S. PATENT DOCUMENTS

| | | | |
|---|---|---|---|
| 2006/0045555 A1* | 3/2006 | Morimoto | G03G 15/507 399/80 |
| 2006/0250630 A1* | 11/2006 | Mori | G06F 3/1205 358/1.13 |
| 2007/0139685 A1* | 6/2007 | Fujii | G03G 15/50 358/1.13 |
| 2007/0220475 A1* | 9/2007 | Asahara | G06F 9/45512 716/116 |
| 2007/0229877 A1* | 10/2007 | Shima | G06F 11/0733 358/1.14 |
| 2007/0279698 A1* | 12/2007 | Ichiki | H04N 1/32635 358/400 |
| 2008/0184340 A1* | 7/2008 | Nakamura | H04L 29/08846 726/3 |
| 2010/0208291 A1* | 8/2010 | Oba | H04N 1/00347 358/1.15 |
| 2013/0097621 A1* | 4/2013 | Henderson | G06F 9/4484 719/320 |
| 2013/0287265 A1* | 10/2013 | Nepomniachtchi | G06K 9/00442 382/115 |
| 2015/0077772 A1* | 3/2015 | Satou | G06F 3/1208 358/1.9 |
| 2016/0127585 A1* | 5/2016 | Wang | H04N 1/00477 358/405 |
| 2016/0191751 A1* | 6/2016 | Izumi | G06F 3/12 358/1.13 |
| 2017/0206044 A1* | 7/2017 | Kim | G06F 3/1242 |
| 2018/0198941 A1* | 7/2018 | Nuggehalli | H04N 1/00973 |

FOREIGN PATENT DOCUMENTS

| | | |
|---|---|---|
| JP | 2011-070472 A | 4/2011 |
| JP | 2011-130117 A | 6/2011 |
| JP | 2016-042677 A | 3/2016 |

* cited by examiner

| Camera | MFP |
|---|---|
| Exposure | Ignore |
| Location | Use machine location |
| Countdown timer | Ignore |
| Picture Size | Change Resolution |
| Flash Mode | Ignore |
| Front/Back Camera | Ignore |

| Settings | | |
|---|---|---|
| Tray Settings | On/Off | On |
| Sound | Location | On |
| | Color mode | Color |
| Display | Resolution | 600dpi |
| Storage | Authorization | All |
| | Image format | Jpeg |
| Camera | Merge Image (ADF) | Vertical |
| Adjustment | Setting popup display | Off |
| Power Saver | Replacement | Scanner |

METHOD FOR CONTROLLING IMAGE FORMING APPARATUS AND IMAGE FORMING APPARATUS USING SAME

CROSS-REFERENCE TO RELATED APPLICATIONS

This application is a continuation application of International application number PCT/KR2017/007034, filed on Jul. 3, 2017 which claimed priority to Korean patent application number 10-2017-0061643, filed on May 18, 2017, in the Korean Intellectual Property Office, the disclosure of which is incorporated by reference herein in its entirety.

BACKGROUND ART

With developments in technology, a user interface device included in an image forming apparatus has advanced. User interface devices using separate operating systems (OSs) may execute, on image forming apparatuses, applications designed for the OSs. For example, when a user interface device of an image forming apparatus is operated by an Android OS, an Android-based application may be executed on the image forming apparatus. Accordingly, image forming apparatuses are able to support various applications to enable a variety of jobs, and functions of the image forming apparatuses expand.

DETAILED DESCRIPTION

Hereinafter, various examples will be provided with reference to the attached drawings. The examples below may be embodied in many different forms. For clarity of explanation, matters that are well known to one of ordinary skill in the art to which examples below pertain will not be described in detail.

It will be understood that when an element is referred to as being "connected to" another element, the element can be directly connected to the other element or intervening elements may be located between the element and the other element. It will be further understood that the terms "comprises" and/or "includes" used herein specify the presence of stated features or components, but do not preclude the presence or addition of one or more other features or components, unless otherwise defined.

It will be understood that although the terms "first", "second", etc. may be used herein to describe various components, these components should not be limited by these terms. These components are only used to distinguish one component from another.

In the following examples, the expression "image forming job" may denote an image-related job (e.g., printing, copying, scanning, or faxing) such as forming images, generating, storing, transmitting, etc. image files, or the like, and the term "job" may indicate an image forming job as well as a series of processes conducted to perform the image forming job.

Also, an "image forming apparatus" may be any device, for example, a printer, a copier, a scanner, a fax machine, a multi-function printer (MFP), a display device, etc., which may perform an image forming job.

Also, a "hard copy" may indicate a job of printing an image on a print medium such as paper, and a "soft copy" may indicate a job of printing an image on a display device such as a television (TV) or a monitor, or a job of saving an image to a memory.

Also, "content" may be any type of data that is a target of an image forming job, for example, a picture, an image, a document file, etc.

Also, "print data" may be data converted into a format printable by a printer.

Also, a "scan file" may be a file generated by a scanner after scanning an image.

Also, a "user" may be a person who uses an image forming apparatus or a device connected to an image forming apparatus by wire or wirelessly and conducts jobs related to image forming jobs. In addition, an "administrator" may be a person who has authority to access all functions of an image forming apparatus and a system. The "user" and the "administrator" may be the same person.

The following examples relate to an image forming apparatus and a method of controlling the same, and matters that are well known to one of ordinary skill in the art to which examples below pertain will not be described in detail.

Figure 1:
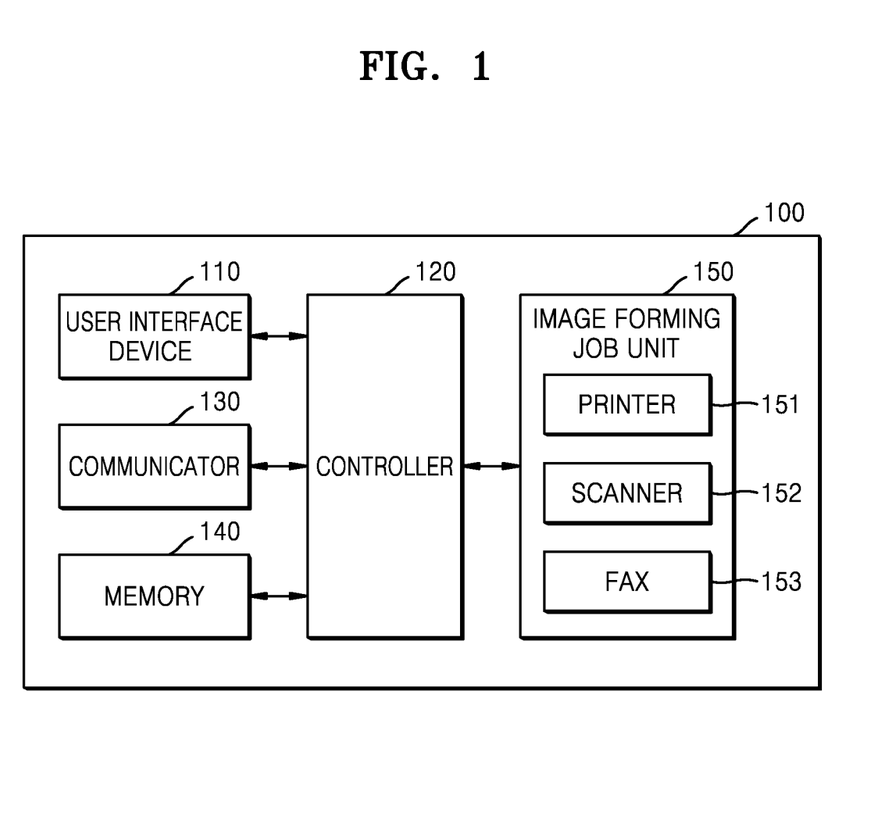
FIG. 1 is a diagram of a structure of an image forming apparatus, according to an example.
Figure 2:
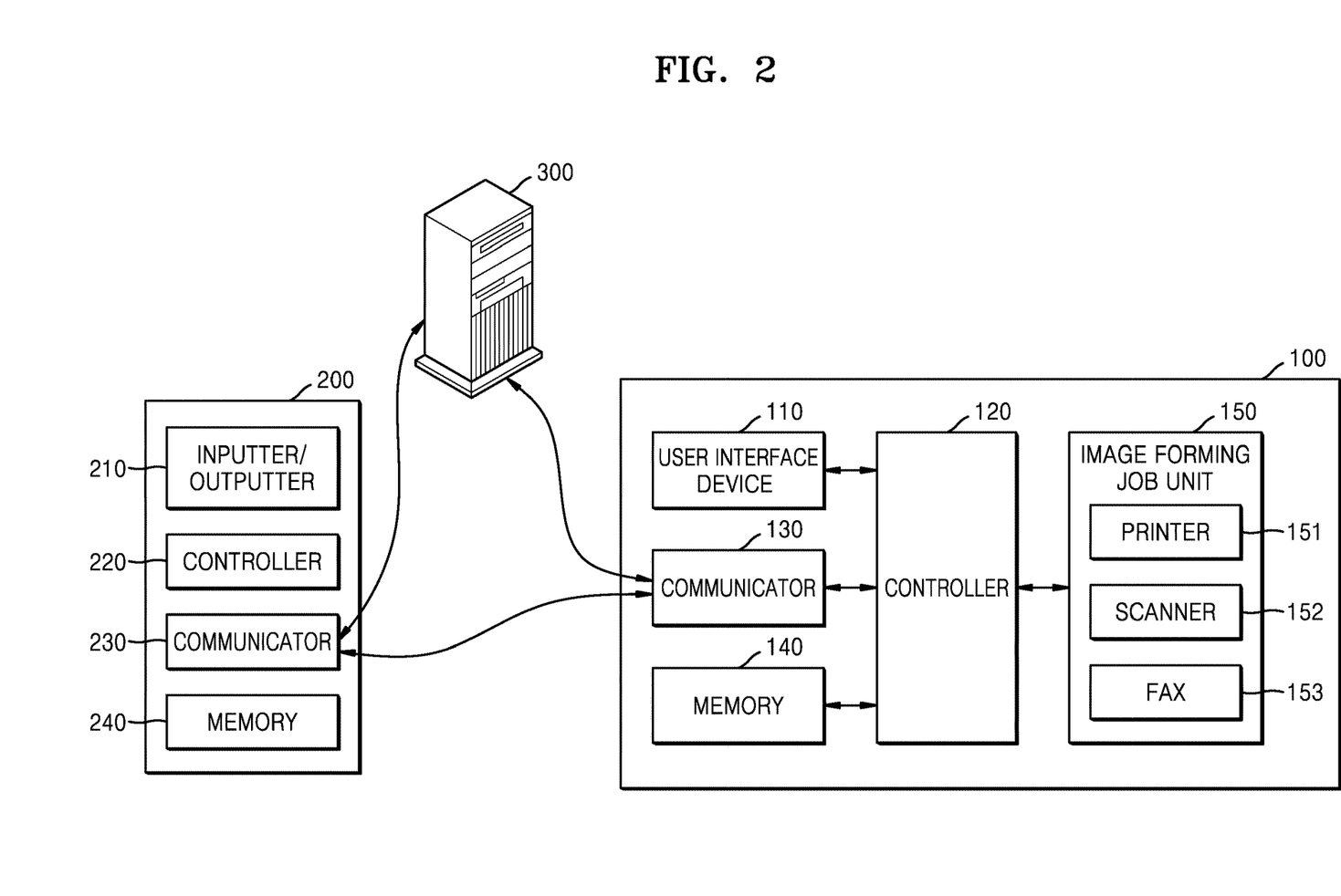
FIG. 2 is a diagram showing a connection between an image forming apparatus and a user terminal or a server, according to an example.

FIG. 1 is a diagram of a structure of an image forming apparatus, according to an example. FIG. 2 is a diagram showing a connection between an image forming apparatus and a user terminal or a server, according to an example.

Referring to FIG. 1, an image forming apparatus 100 may include a user interface device 110, a controller 120, a communicator 130, a memory 140, and an image forming job unit 150. Also, although not shown, the image forming apparatus 100 may further include a power supply for supplying power to each component.

The user interface device 110 may include an input unit for receiving an input from a user for performing an image forming job, and an output unit for displaying a result of performing the image forming job or information such as a state of the image forming apparatus 100. For example, the user interface device 110 may include an operation panel that receives a user input, a display panel that displays a screen, or the like.

In an example, the input unit may include a device, for example, a keyboard, a physical button, a touch screen, a camera, a microphone, or the like, which are capable of receiving various types of user inputs. Also, the output unit may include, for example, a display panel, a speaker, or the like. However, the examples are not limited thereto. The user interface device 110 may include a device that supports various inputs/outputs.

The controller 120 may control an operation of the image forming apparatus 100 and may include at least one processor such as a central processing unit (CPU). The controller 120 may include other components included in the image forming apparatus 100 so that the controller 120 may perform an operation corresponding to the user input transmitted from the user interface device 110. The controller 120 may include at least one specialized processor corresponding to each function or may be an integrated processor.

For example, the controller 120 may execute a program stored in the memory 140, read data or files stored in the memory 140, or store new files in the memory 140.

The communicator 130 may perform wired/wireless communication with another device or a network. To this end, the communicator 130 may include a communication module supporting at least one of various wired/wireless communication methods. For example, the communication module may be a chipset, a sticker/barcode (e.g., a sticker including a Near Field Communication (NFC) tag), etc. including information necessary for communication.

The wireless communication may include, for example, at least one of Wireless Fidelity (Wi-Fi), Wi-Fi Direct, Bluetooth, Ultra Wide Band (UWB), NFC, or the like. The wired communication may include, for example, at least one of universal serial bus (USB), High Definition Multimedia Interface (HDMI), or the like.

The communicator 130 may be connected to an external device outside the image forming apparatus 100 and may receive/transmit signals or data from/to the external device.

Referring to FIG. 2, the image forming apparatus 100 may be connected to a user terminal 200 through the communicator 130. The communicator 130 may transmit, to the controller 120, the signals or data received from the user terminal 200 or transmit, to the user terminal 200, signals or data generated by the controller 120. For example, when the communicator 130 receives a print command signal and print data from the user terminal 200, the controller 120 may output the received print data through a printer 151.

In the example of FIG. 2, the user terminal 200 may include an input unit/output unit 210 (i.e., an inputter/outputter), a controller 220, a communicator 230, and a memory 240. The controller 220 may execute programs stored in the memory 240 and may transmit signals or data generated due to the execution of the programs to the image forming apparatus 100 through the communicator 230, thereby controlling an image forming job. The user terminal 200 may include, for example, a smartphone, a tablet computer, a personal computer (PC), a home appliance, medical equipment, a camera, a wearable device, or the like.

The communicator 130 may be directly connected to a server 300 and may receive/transmit signals or data from/to the server 300. Also, the communicator 130 may be connected to the user terminal 200 through the server 300. For example, the communicator 130 of the image forming apparatus 100 may receive/transmit signals or data from/to the communicator 230 of the user terminal 200 through the server 300.

Referring again to FIG. 1, programs such as applications may be installed and various types of data such as files may be stored in the memory 140. The controller 120 may access and use the data stored in the memory 140 or may store new data in the memory 140. Also, the controller 120 may execute the programs installed in the memory 140. In addition, the controller 120 may install, in the memory 140, applications received from an external source through the communicator 130.

The image forming job unit 150 may perform an image forming job such as copying, printing, scanning, or faxing.

The image forming job unit 150 may include the printer 151, a scanner 152, and a fax machine 153, but, according to necessity, the image forming job unit 150 may include only some of the above components or may further include components for performing other types of image forming jobs.

The printer 151 may produce an image on a recording medium by using various print methods such as an electrophotography method, an inkjet method, a thermal transfer method, a thermosensitive method, or the like.

The scanner 152 may irradiate light onto a document and receive reflected light, thus reading an image recorded on the document. As an image sensor that reads the image from the document, such as a charge coupled device (CCD), a contact-type image sensor (CIS), or the like may be used. The scanner 152 may be at a location where the document is fixed and may have a flatbed structure in which the image is read while the image sensor moves, a document feed structure in which the image sensor is at a fixed location and the document is fed, or a combination thereof.

The fax machine 153 may share a structure for scanning an image with the scanner 152, share a structure for printing a received file with the printer 151, and transmit a scanned file to a destination or receive a file from an external source.

In various examples, names of the above-described components of the image forming apparatus 100 may change. Also, the image forming apparatus 100 may include at least one of the above-described components and may include more or fewer components than the components shown in the drawing.

The user interface device 110 of FIG. 1 may include a separate control system. For example, separately from the controller 120 of the image forming apparatus 100, the user interface device 110 may include a control system (e.g., a controller, a memory, or the like) for controlling a user interface (UI) provided by the user interface device 110. In the control system of the user interface device 110, an operating system (OS) for providing a UI and programs such as applications for supporting various functions may be installed.

Figure 3:
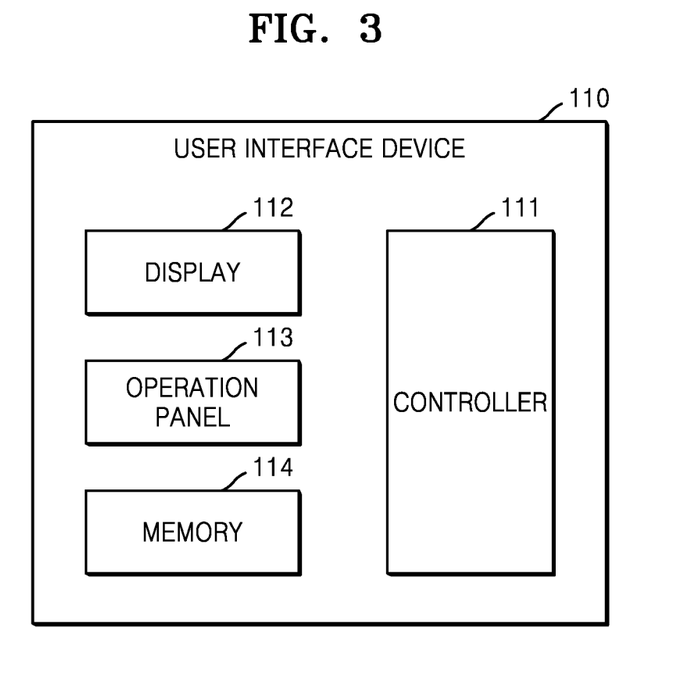
FIG. 3 is a diagram of a user interface device, according to an example.

FIG. 3 is a diagram of a user interface device, according to an example.

Referring to FIG. 3, the user interface device 110 may include a controller 111, a display 112, an operation panel 113, and a memory 114.

As shown in FIG. 3, the user interface device 110 may include a control system (e.g., the controller 111 and the memory 114) separately from the controller 120. The controller 111 and the memory 114 may control a UI provided by the user interface device 110. Like the controller 120, the controller 111 may include a processor such as a CPU.

The display 112 may include a liquid crystal display (LCD) panel, a light-emitting diode (LED) panel, an organic LED (OLED) panel, or the like, and the operation panel 113 may include a physical button, a touch screen, or the like.

The user interface device 110 may be separable from the image forming apparatus 100 and may perform an input/output function. For example, when separated from the image forming apparatus 100, the user interface device 110 may operate similarly to a tablet computer. In the case of the user interface device 110 that is separable, the user interface device 110 may further include a communicator to communicate with the image forming apparatus 100 as well as an external device.

Applications for supporting various functions may be installed in the user interface device 110 of the image forming apparatus 100. However, when the applications use functions that are not supported by the image forming apparatus 100 and/or when the image forming apparatus 100 ignores execution requests of such applications, expected results are not provided by the applications and the image forming apparatus 100 may malfunction. In the following description, examples of a method of controlling the image forming apparatus 100 to normally execute an application, which uses a function that is not supported by the image forming apparatus 100, on the image forming apparatus 100, and the image forming apparatus 100 using the method will be described.

Figure 4:
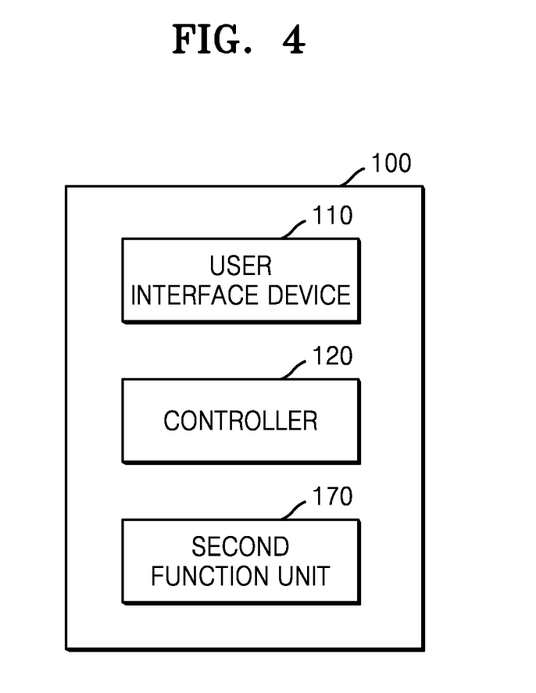
FIG. 4 is a diagram of a structure of an image forming apparatus, according to an example.

FIG. 4 is a diagram of a structure of an image forming apparatus, according to an example.

Referring to FIG. 4, the image forming apparatus 100 may include the user interface device 110, the controller 120, and a second function unit 170.

Applications for supporting various functions may be installed in the user interface device 110. For example, there may be applications for supporting functions such as copying, printing, scanning, faxing, or the like, which are provided by the image forming apparatus 100. In addition, as applications developed by third parties, there may be applications that support various functions and are executable on the same OS environment as the user interface device 110 of the image forming apparatus 100. A user may select an icon of the application installed in the user interface device 110 and thus may transmit an execution request of the selected application.

The user interface device 110 may receive an execution request of an application using a first function and may replace an execution request of the first function according to the execution request of the application with an execution request of a second function corresponding to the first function. Here, the first function may be a function that is not supported by the image forming apparatus 100, and the second function may be a function that is supported by the image forming apparatus 100. For example, the first function may be a camera function, and the second function may be a scanning function.

The user interface device 110 may determine whether a first function unit to execute the first function exists. When the first function unit does not exist according to a determination result, the user interface device 110 may replace the execution request of the first function with the execution request of the second function.

The user interface device 110 may convert a first setting value regarding the first function into a second setting value regarding the second function and may replace the execution request of the first function based on the first setting value with the execution request of the second function based on the second setting value. The user interface device 110 may display, on a screen, the second setting value regarding the second function.

The user interface device 110 may check a state of the second function unit 170 executing the second function, and, according to the checked state, the user interface device 110 may transmit the execution request of the second function to the controller 120.

According to the execution request of the second function, the controller 120 may generate an execution command of the second function. In response to the execution request of the second function, the controller 120 may perform user authentication regarding a user's authority to execute the second function. When the authentication succeeds according to an authentication result, the controller 120 may generate the execution command of the second function. When the authentication fails, the controller 120 may transmit the authentication result to the user interface device 110 to allow the user interface device 110 to display an error message.

The second function unit 170 may execute the second function according to the execution command.

The user interface device 110 may receive an execution result of the second function and may convert the execution result into a format designated by the application using the first function.

In a Bring Your Own Device (BYOD) environment in which the image forming apparatus 100 is controlled by using the user terminal 200 outside the image forming apparatus 100, an application, which is the same as the application installed in the user interface device 110 and using the first function, may be installed in the user terminal 200. When the application using the first function is executed on the user terminal 200 while the image forming apparatus 100 is controlled through the communication therewith, the user terminal 200 may detect the execution request of the first function according to the execution request of the application using the first function and may replace the execution request of the first function with the execution request of the second function, thus transmitting the execution request of the second function to the image forming apparatus 100. To this end, the image forming apparatus 100 may further include the communicator 130 that communicates with the user terminal 200 controlling the image forming apparatus 100. The communicator 130 may receive the execution request of the second function corresponding to the first function from the user terminal 200 that receives the execution request of the application using the first function. The controller 120 of the image forming apparatus 100 may generate the execution command of the second function according to the execution request of the second function and may execute the second function according to the execution command of the second function unit 170.

Figure 5:
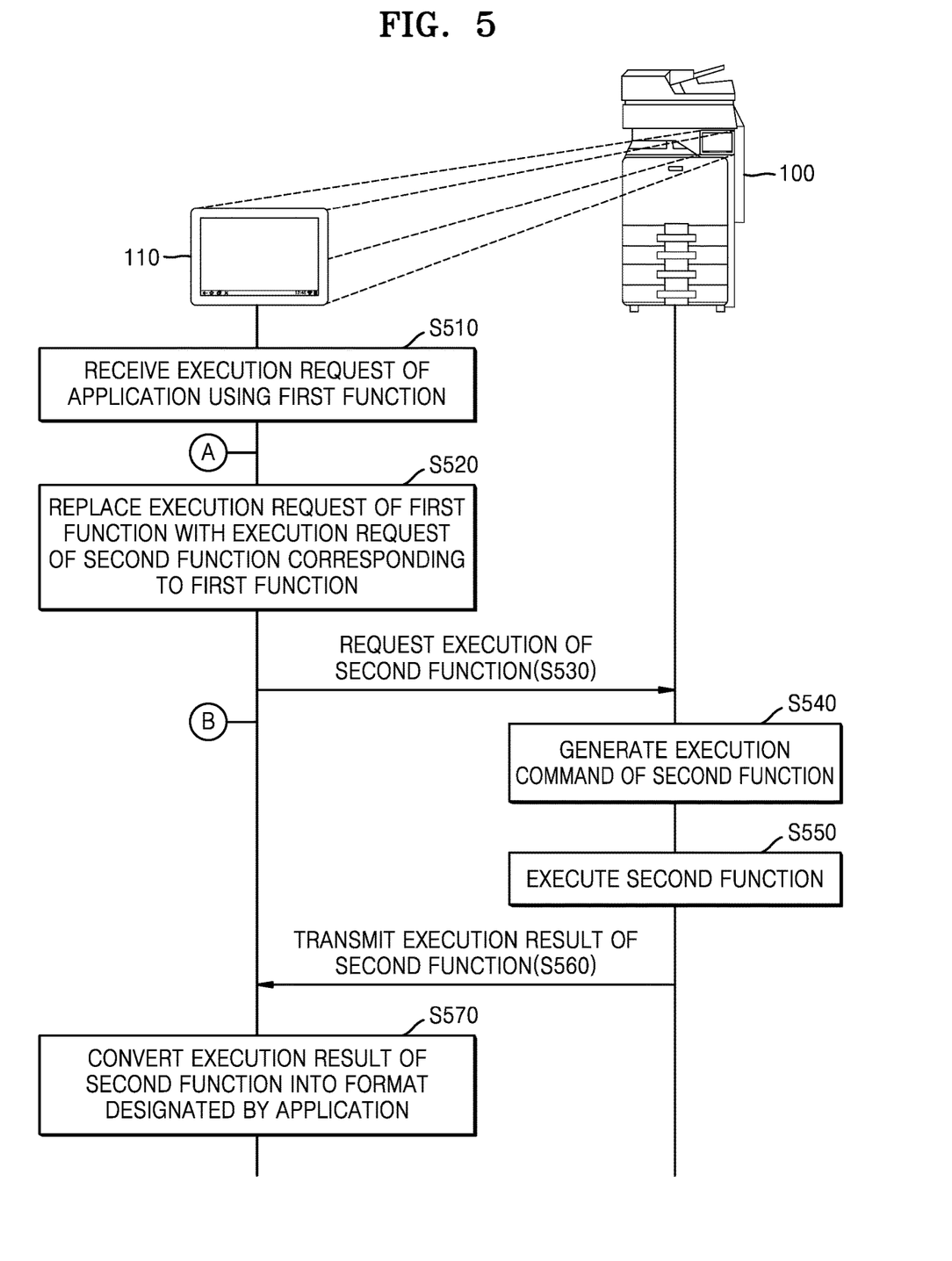
FIG. 5 is a diagram of operations of an image forming apparatus and a user interface device when an execution request of an application using a first function is received by the image forming apparatus, according to an example.

FIG. 5 is a diagram of operations of an image forming apparatus and a user interface device when an execution request of an application using a first function is received by the image forming apparatus, according to an example.

Hereinafter, an example of a case in which the first function is a camera function and the second function is a scanning function will be described.

Referring to FIG. 5, applications for supporting unique functions of the image forming apparatus 100 such as copying, printing, scanning, faxing, or the like as well as applications for expanding unique functions provided by the image forming apparatus 100 may be installed in the user interface device 110. The user may select an icon of an application installed in the user interface device 110 and may transmit the execution request of the selected application.

The user interface device 110 of the image forming apparatus 100 may receive, from the user, the execution request of the application using the first function in operation S510. For example, the user interface device 110 may receive an execution request of an application using a camera function from the user.

The user interface device 110 of the image forming apparatus 100 may replace the execution request of the first function with the execution request of the second function corresponding to the first function in operation S520. For example, the user interface device 110 of the image forming apparatus 100 may replace the execution request of the camera function with an execution request of a scanning function.

The user interface device 110 of the image forming apparatus 100 may transmit the execution request of the second function to the controller 120 of the image forming apparatus 100 in operation S530. The controller 120 of the image forming apparatus 100 may receive the execution request of the second function corresponding to the first function from the user interface device 110 of the image forming apparatus 100. For example, the user interface device 110 may transmit the execution request of the scanning function to the controller 120 of the image forming apparatus 100.

Figure 6:
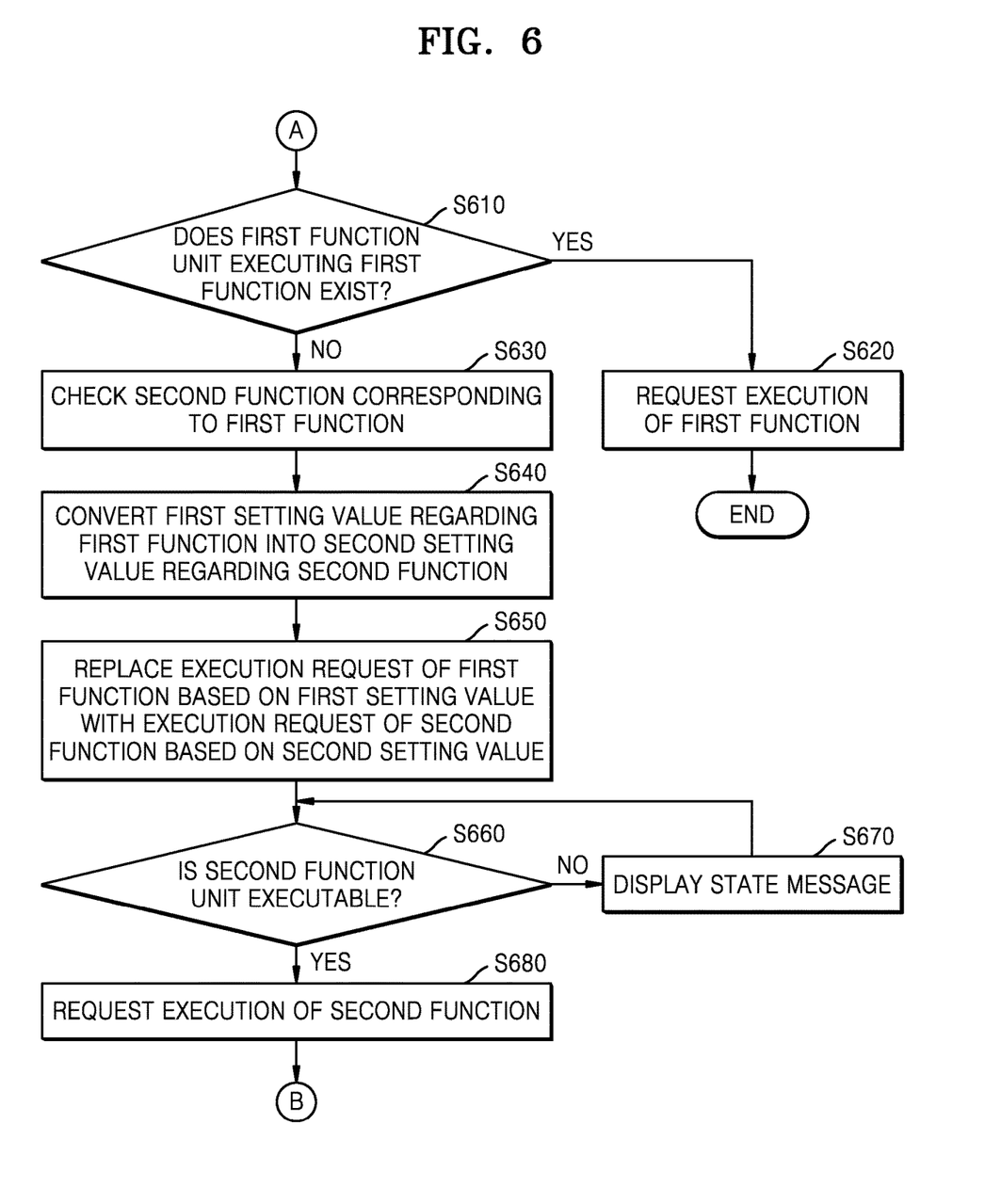
FIG. 6 is a diagram of processes by which a user interface device of an image forming apparatus replaces an execution request of a first function with an execution request of a second function corresponding to the first function and requests the execution of the second function, according to an example.

FIG. 6 is a diagram of processes by which a user interface device of an image forming apparatus replaces an execution request of a first function with an execution request of a second function corresponding to the first function and requests the execution of the second function, according to an example.

Referring to FIG. 6, the user interface device 110 of the image forming apparatus 100 may determine whether the first function unit executing the first function exists in operation S610. For example, the user interface device 110 of the image forming apparatus 100 may identify whether the first function unit capable of executing the first function is included in the image forming apparatus 100. As an example, the user interface device 110 of the image forming apparatus 100 may identify whether a camera module capable of executing the camera function is included in the image forming apparatus 100.

In operation S620, the user interface device 110 of the image forming apparatus 100 may request the execution of the first function when the first function unit executing the first function exists. Accordingly, as the first function unit executes the first function, the application using the first function may be normally executed. For example, when the image forming apparatus 100 includes the camera module capable of executing the camera function, the user interface device 110 of the image forming apparatus 100 may request the execution of the camera function of the camera module of the image forming apparatus 100.

In operation S630, the user interface device 110 of the image forming apparatus 100 may check the second function corresponding to the first function when the first function unit executing the first function does not exist. For example, the user interface device 110 of the image forming apparatus 100 may check the second function unit 170 replacing the first function unit by using a mapping table in which the second function unit 170 capable of replacing the first function unit is made to correspond to the first function unit. The mapping table may be stored in the memory 114 of the user interface device 110 in advance. For example, when a function unit capable of replacing the camera module corresponds to the scanner 152 in the mapping table, it is identified that a function replacing the camera function is the scanning function.

In operation S640, the user interface device 110 of the image forming apparatus 100 may convert the first setting value regarding the first function into the second setting value regarding the second function. For example, the user interface device 110 of the image forming apparatus 100 may convert a setting value regarding a camera function into a setting value regarding a scanning function.

Figure 7:
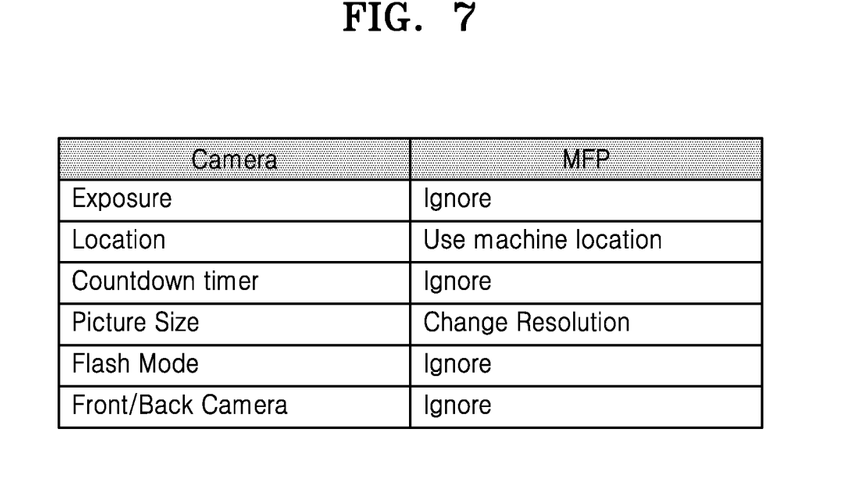
FIG. 7 illustrates a conversion table showing a conversion of a first setting value regarding a first function into a second setting value regarding a second function in a user interface device of an image forming apparatus, according to an example.

FIG. 7 illustrates a conversion table showing a conversion of a first setting value regarding a first function into a second setting value regarding a second function in a user interface device of an image forming apparatus, according to an example.

Referring to FIG. 7, a conversion table is illustrated in which the first function is the camera function and the second function capable of replacing the first function is the scanning function. The conversion table may be stored in the memory 114 of the user interface device 110 in advance.

The camera may have various setting items for executing the camera. As shown in FIG. 7, various setting items such as exposure, a location, a countdown timer, a picture size, a flash mode, and a front/back camera may be used while the camera is executed.

The scanner 152 functions similarly to the camera in that the scanner 152 produces an image as an execution result. However, setting items for executing the camera are not exactly the same as those of the scanner 152. For example, a difference is that various modules included in the camera are not included in the scanner 152 or modules of the scanner 152 are not able to reflect setting values of the setting items for the execution of the camera. Furthermore, some setting items are irrelevant to the execution of the scanner 152.

The user interface device 110 of the image forming apparatus 100 may use a conversion table to convert the first setting value regarding the first function into the second setting value regarding the second function and may convert the first setting value regarding the first function into the second setting value regarding the second function. For example, as illustrated in the example of FIG. 7, because the setting items of the camera function such as exposure, a countdown timer, a flash mode, and a front/back camera are irrelevant to functions of the scanner 152, respective settings regarding the functions of the scanner 152 may be ignored. On the contrary, a location setting regarding the camera function may be activated so that a location of the image forming apparatus 100 including the scanner 152 may be used when the scanning function is executed. A picture size setting regarding the camera function may be reflected as a resolution setting regarding the scanning function, and thus, a scanning resolution setting of the scanner 152 may be changed.

The user interface device 110 may display the second setting value regarding the second function on the screen. For example, the user interface device 110 may display the second setting value regarding the second function on the screen after finishing conversion of the first setting value regarding the first function into the second setting value regarding the second function. When the first function is the camera function and the second function is the scanning function, the user may check which setting values are changed when the camera function is changed to the scanning function.

Figure 8:
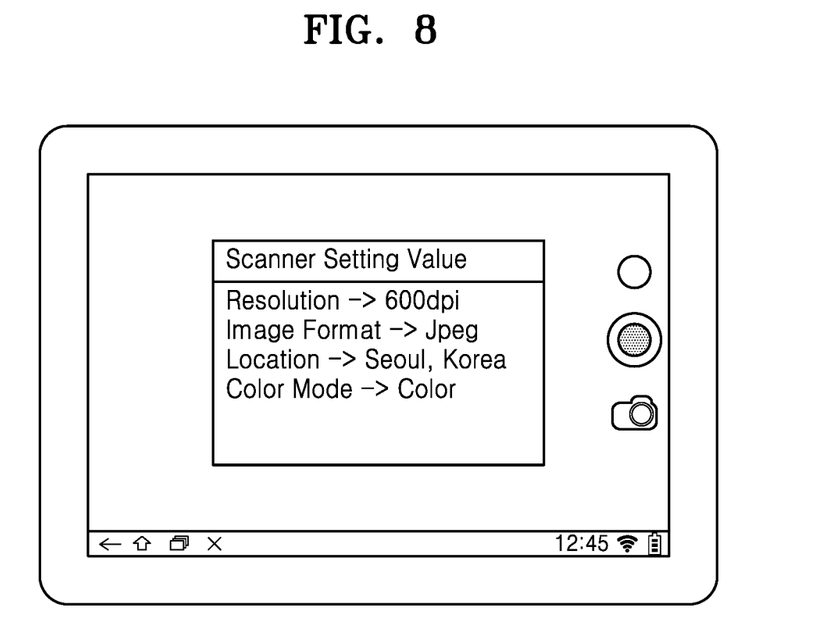
FIG. 8 is a diagram showing a screen displaying a second setting value regarding a second function which is converted from a first setting value regarding a first function in a user interface device of an image forming apparatus, according to an example.

FIG. 8 is a diagram showing a screen displaying a second setting value regarding a second function which is converted from a first setting value regarding a first function in a user interface device of an image forming apparatus, according to an example.

Referring to FIG. 8, it is possible to check the setting values of the scanning function replacing the camera function when the first function is the camera function and the second function is the scanning function. As illustrated in FIG. 8, it is identified that a scan resolution is 600 dpi, an image format is JPEG, a location is set as Seoul, Korea, and a color mode is on (i.e., color). In this case, the user may change setting values of some setting items of the scanning function on the displayed screen. For example, the scan resolution of 600 dpi may be increased or decreased.

Although not illustrated in FIG. 8, the user interface device 110 may display a screen on which the setting items and/or setting values regarding the first function respectively correspond to the setting items and/or setting values regarding the second function. Accordingly, when the first function is replaced with the second function, the user may check which setting values regarding the first function are changed to which setting values of the second function.

Referring again to FIG. 6, in operation S650, the user interface device 110 of the image forming apparatus 100 may replace the execution request of the first function based on the first setting value with the execution request of the second function based on the second setting value. For example, the user interface device 110 of the image forming apparatus 100 may replace the execution request of the camera function based on the first setting value with the execution request of the scanning function based on the second setting value.

In operation S660, the user interface device 110 of the image forming apparatus 100 may check the state of the second function unit 170 executing the second function and determine whether the second function unit 170 is executable. For example, the user interface device 110 of the image forming apparatus 100 may check the state of the scanner 152 and determine whether the scanner 152 is executable.

In operation S670, when the second function unit 170 is not executable as a result of checking the state of the second function unit 170, the user interface device 110 of the image forming apparatus 100 may display a state message indicating that the second function unit 170 is not currently executable or an error message indicating that it is not possible to drive the second function unit 170. For example, when the scanner 152 is not executable, the user interface device 110 of the image forming apparatus 100 may display an error message indicating that the scanner 152 is presently working or it is not possible to drive the scanner 152.

In operation S680, when the second function unit 170 is executable as a result of checking the state of the second function unit 170, the user interface device 110 of the image forming apparatus 100 may transmit the execution request of the second function to the controller 120 of the image forming apparatus 100. For example, when the scanner 152 is executable, the user interface device 110 of the image forming apparatus 100 may transmit the execution request of the scanning function to the controller 120 of the image forming apparatus 100.

Referring again to FIG. 5, according to the execution request of the second function, the controller 120 of the image forming apparatus 100 may generate the execution command of the second function in operation S540. In this case, the controller 120 may perform the user authentication regarding the authority to execute the second function in response to the execution request of the second function. When the authentication succeeds according to the authentication result, the controller 120 may generate the execution command of the second function. When the authentication fails, the controller 120 may transmit, to the user interface device 110, the authentication result to allow the user interface device 110 to display the error message.

For example, as the execution request of the scanning function is transmitted, the controller 120 of the image forming apparatus 100 may perform the user authentication regarding the authority to execute the scanning function in response to the execution request of the scanning function. When the authentication succeeds according to the authentication result, the controller 120 may generate an execution command of the scanning function. To this end, the user interface device 110 of the image forming apparatus 100 may transmit user information together with the execution request of the scanning function to the controller 120. Such user information may be used not only for the user authentication but also for other purposes such as user billing management, or the like.

The second function unit 170 of the image forming apparatus 100 may execute the second function according to the execution command in operation S550. For example, the scanner 152 may execute the scanning function according to the execution command.

The second function unit 170 of the image forming apparatus 100 may transmit an execution result of the second function to the user interface device 110 in operation S560. For example, the scanner 152 may transmit an execution result of the scanning function to the user interface device 110. In this case, other information such as user billing information, or the like, may also be transmitted.

The user interface device 110 of the image forming apparatus 100 may convert the execution result of the second function into a format designated by the application using the first function in operation S570. The user interface device 110 of the image forming apparatus 100 may display the execution result of the second function in the converted format. For example, the user interface device 110 of the image forming apparatus 100 may convert the execution result of the scanning function into a file format such as JPG, PNG, PDF, TIFF, or the like. Also, when multiple images are scanned, the user interface device 110 of the image forming apparatus 100 may produce scanned results into one image.

Figure 9:
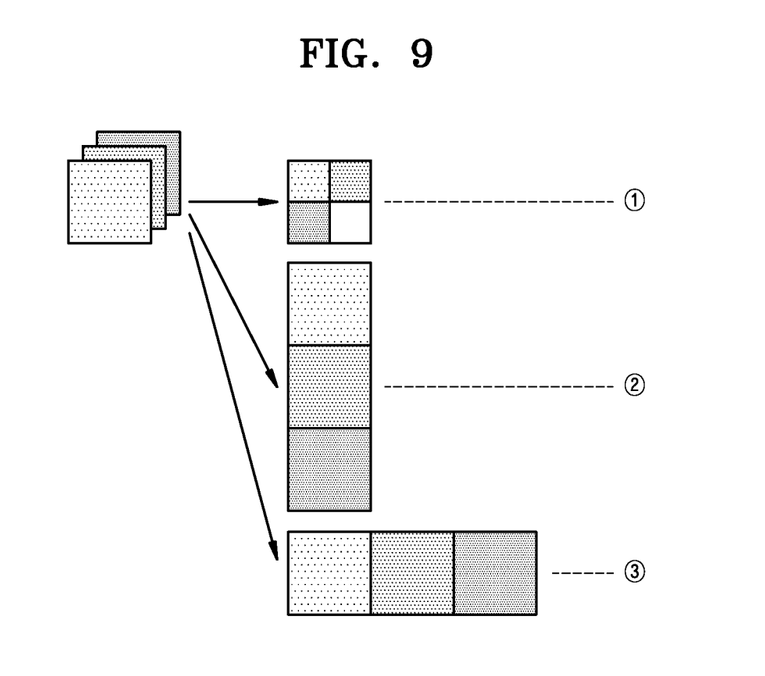
FIG. 9 illustrates a process in which, when multiple images are scanned in an image forming apparatus, scanned results are produced into one image, according to an example.

FIG. 9 illustrates a process in which, when multiple images are scanned in an image forming apparatus, scanned results are produced into one image, according to an example.

Referring to FIG. 9, multiple scanned images are adjusted in size and arranged to fit into one image having a size designated by the user in the case of ①. In the case of ② and ③, the user vertically or horizontally aligns multiple scanned images to create one image such as a panorama image.

Figure 10:
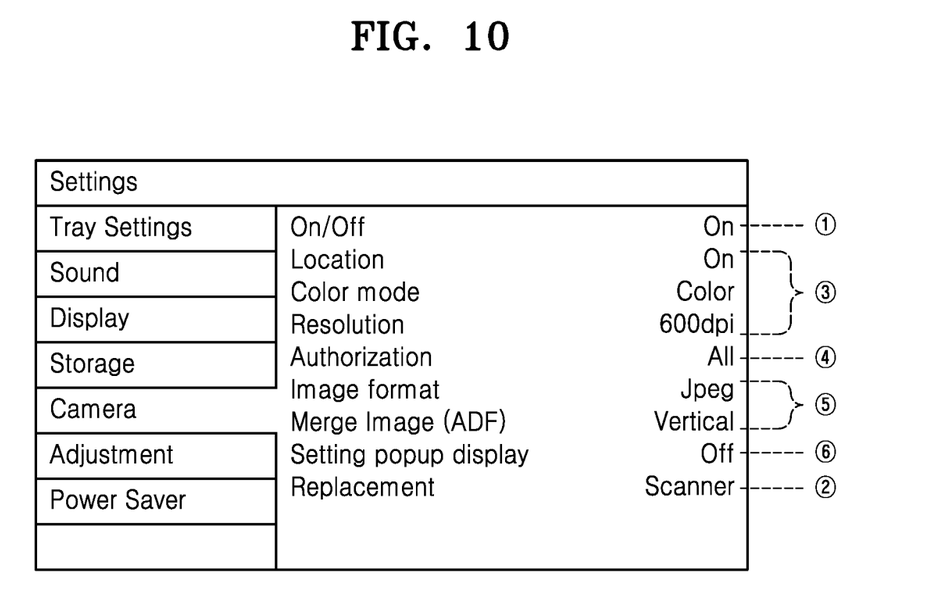
FIG. 10 shows a setting menu on which second setting values regarding a second function corresponding to a first function may be set in advance in a user interface device of an image forming apparatus, according to an example.

FIG. 10 shows a setting menu on which second setting values regarding a second function corresponding to a first function may be set in advance in a user interface device of an image forming apparatus, according to an example.

Referring to FIG. 10, when a first function is the camera function and a second function is the scanning function, the camera function may be selected on the setting menu. For example, a selection of either On or Off may be made to replace the camera function with another function (①), and the scanning function may be selected as a replacement for the camera function (②). In the example of FIG. 10, when the location setting item of the scanning function replacing the camera function is on, it is found that a location value of the image forming apparatus 100 is replaced with the location setting item, the color mode is set as color, and the resolution is 600 dpi (③). When the camera function is replaced with the scanning function of the image forming apparatus 100, whether to perform user authentication may be set in advance (④). Also, when execution results of the scanning function are set to be stored as JPEG images and multiple images are scanned, the scanned images may be vertically aligned and produced into one image (⑤). In addition, settings may be made not to display, on the screen, second setting values regarding the scanning function after converting first setting values regarding the camera function into the second setting values regarding the scanning function (⑥).

Figure 11:
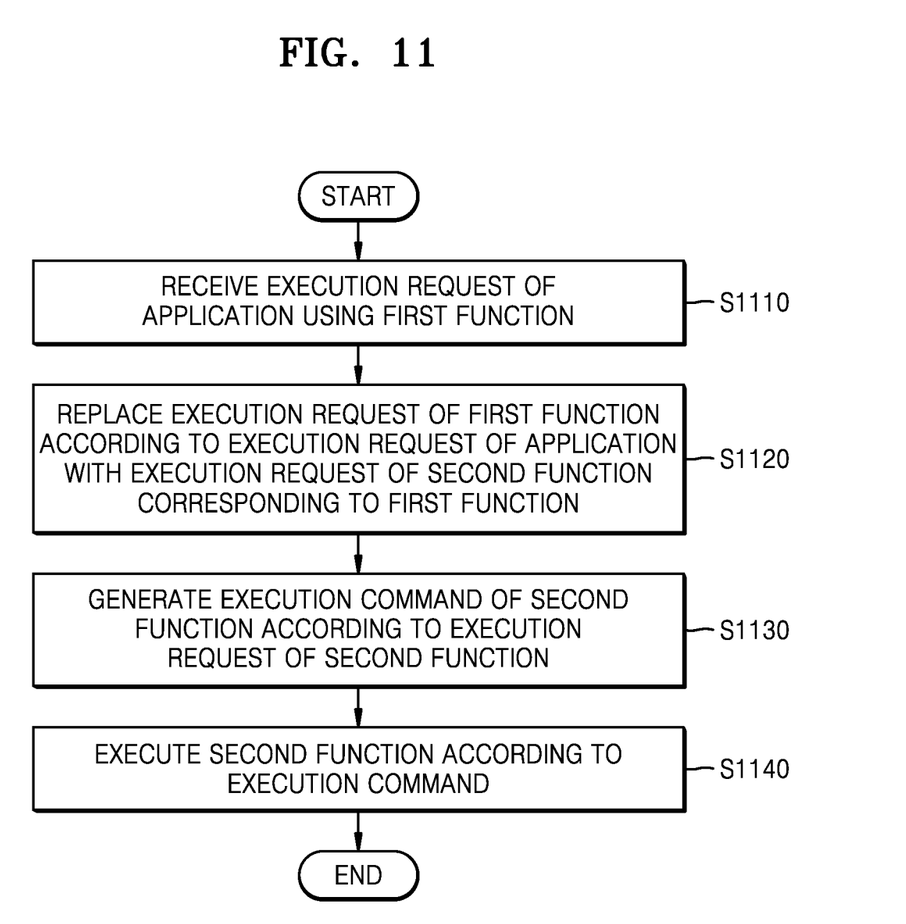
FIG. 11 is a flowchart of a method of controlling an image forming apparatus, according to an example.

FIG. 11 is a flowchart of a method of controlling an image forming apparatus, according to an example.

Referring to FIG. 11, the image forming apparatus 100 may receive the execution request of the application using the first function in operation S1110.

In operation S1120, the image forming apparatus 100 may replace the execution request of the first function according to the execution request of the application with the execution request of the second function. Here, the first function may be a function that is not supported by the image forming apparatus 100, and the second function may be a function that is supported by the image forming apparatus 100. For example, the first function may be the camera function, and the second function may be the scanning function.

The image forming apparatus 100 may determine whether the first function unit executing the first function exists. When the first function unit does not exist according to a determination result, the execution request of the first function may be replaced with the execution request of the second function.

The image forming apparatus 100 may convert the first setting value regarding the first function into the second setting value regarding the second function and may replace the execution request of the first function based on the first setting value with the execution request of the second function based on the second setting value. The image forming apparatus 100 may display the second setting value regarding the second function on the screen.

The image forming apparatus 100 may check the state of the second function unit 170 executing the second function and may request the execution of the second function according to the checked state.

The image forming apparatus 100 may generate the execution command of the second function according to the execution request of the second function in operation S1130. The image forming apparatus 100 may perform user authentication regarding the authority to execute the second function in response to the execution request of the second function. When the authentication succeeds according to the authentication result, the execution command of the second function may be generated. The image forming apparatus 100 may display an error message when the authentication fails.

The image forming apparatus 100 may execute the second function according to the execution command in operation S1140. The image forming apparatus 100 may convert the execution result of the second function into a format designated by the application using the first function.

Figure 12:
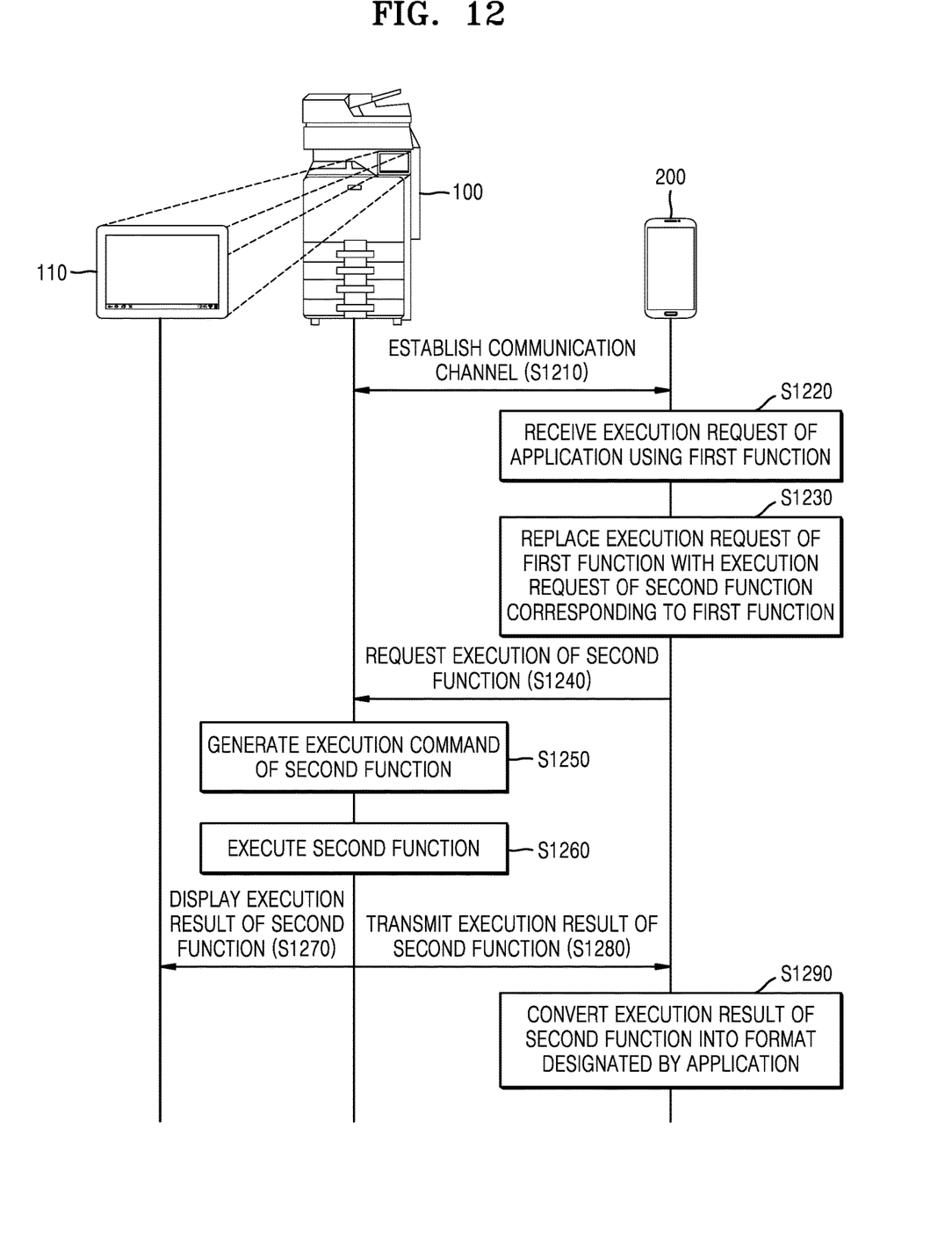
FIG. 12 is a diagram of operations of an image forming apparatus and a user terminal when an execution request of an application using a first function is received by the user terminal capable of controlling the image forming apparatus through communication therewith, according to an example.

FIG. 12 is a diagram of operations of an image forming apparatus and a user terminal when an execution request of an application using a first function is received by the user terminal capable of controlling the image forming apparatus through communication therewith, according to an example.

Referring to FIG. 12, in a BYOD environment in which the image forming apparatus 100 is controlled by the user terminal 200 outside the image forming apparatus 100, when the application that is the same as the application, which uses the first function and is installed in the user interface device 110, is installed in the user terminal 200 and when the application using the first function is executed while the user terminal 200 controls the image forming apparatus 100 by communicating therewith, the image forming apparatus 100 and the user terminal 200 may operate as follows.

The image forming apparatus 100 and the user terminal 200 may establish a communication channel to control the image forming apparatus 100 by using the user terminal 200 in operation S1210.

The user terminal 200 may receive, from the user, an execution request of an application using a first function and may detect the execution request of the first function according to the execution request of the application using the first function in operation S1220.

The user terminal 200 may replace the execution request of the first function with an execution request of the second function corresponding to the first function in operation S1230.

The user terminal 200 may transmit the execution request of the second function to the image forming apparatus 100 in operation S1240. The communicator 130 of the image forming apparatus 100 may receive, from the user terminal 200, the execution request of the second function corresponding to the first function.

The controller 120 of the image forming apparatus 100 may generate the execution command of the second function according to the execution request of the second function in operation S1250.

The second function unit 170 of the image forming apparatus 100 may execute the second function according to the execution command in operation S1260.

The user interface device 110 of the image forming apparatus 100 may display the execution result of the second function in operation S1270.

The communicator 130 of the image forming apparatus 100 may transmit the execution result of the second function to the user terminal 200 in operation S1280.

The user terminal 200 may convert the execution result of the second function into a format designated by the application using the first function installed in the user terminal 200 in operation S1290.

The one or more examples may be realized as a non-transitory computer-readable recording medium in which instructions executable by a computer and data are stored. At least one of the instructions and data may be stored as program code, and when executed by a processor, the at least one of the instructions and data may generate a certain program module and perform a certain operation. Examples of the non-transitory computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, photomagnetic data storage devices, optical data storage devices, hard disks, solid state disks (SSDs), and any device capable of storing instructions or software, relevant data, data files, and data structures, and providing processors or computers with instructions or software, relevant data, data files, and data structures so that the processors or computers can execute the instructions. For example, the non-transitory computer-readable recording medium may be the memory 140 of the image forming apparatus 100 or the memory 114 of the user interface device 110.

Examples have been particularly shown and described above. However, it will be understood by one of ordinary skilled in the art that various changes in form and details may be made to the above described examples without departing from the spirit and scope of the disclosure as defined by the appended claims. Thus, the examples should be considered in descriptive sense only and not for purposes of limitation. Therefore, the scope of the disclosure is defined not by the above description of the disclosure but by the appended claims, and all differences within the scope will be construed as being included in the disclosure.

What is claimed is:

1. An image forming apparatus comprising:
a user interface device to:
receive an execution request of an application using a first function,
determine whether a first device to execute the first function is included in the image forming apparatus, and
when the first device to execute the first function is not included in the image forming apparatus, replace an execution request of the first function according to the execution request of the application with an execution request of a second function corresponding to the first function;
a controller to generate an execution command of the second function according to the execution request of the second function; and
a second device, included in the image forming apparatus, to execute the second function according to the execution command,.
wherein the first function includes a camera function that is not supported by the image forming apparatus, and the second function includes a scanning function that is supported by the image forming apparatus.

2. The image forming apparatus of claim 1, wherein the user interface device is to convert a first setting value regarding the first function into a second setting value regarding the second function and replace the execution request of the first function based on the first setting value with the execution request of the second function based on the second setting value.

3. The image forming apparatus of claim 2, wherein the user interface device is to display the second setting value regarding the second function on a screen.

4. The image forming apparatus of claim 2, wherein the user interface device is to convert the first setting value regarding the first function into the second setting value regarding the second function using a conversion table.

5. The image forming apparatus of claim 4, wherein the user interface device is to display a setting menu to receive a user selection to set the second setting value corresponding to the first setting value in the conversion table.

6. The image forming apparatus of claim 1, wherein the controller is to perform user authentication regarding authority to execute the second function in response to the execution request of the second function and generate the execution command of the second function when the user authentication succeeds according to an authentication result.

7. The image forming apparatus of claim 1, wherein the user interface device is to check a state of the second device that executes the second function and transmit, to the controller, the execution request of the second function according to the checked state.

8. The image forming apparatus of claim 1, wherein the user interface device is to receive an execution result of the second function and convert the execution result into a format designated by the application.

9. The image forming apparatus of claim 1, further comprising a communicator to:
perform communication with a user terminal controlling the image forming apparatus, and
receive the execution request of the second function corresponding to the first function from the user terminal that receives the execution request of the application using the first function.

10. The image forming apparatus of claim 1, wherein the user interface device is to determine the second function corresponding to the first function using a mapping table.

11. A method of controlling an image forming apparatus, the method comprising:
receiving an execution request of an application using a first function;
determining whether a first device to execute the first function is included in the image forming apparatus;
when the first device to execute the first function is not included in the image forming apparatus, replacing an execution request of the first function according to the execution request of the application with an execution request of a second function corresponding to the first function;
generating an execution command of the second function according to the execution request of the second function; and
executing the second function, by a second device included in the image forming apparatus, according to the execution command,
wherein the first function includes a camera function that is not supported by the image forming apparatus, and the second function includes a scanning function that is supported by the image forming apparatus.

12. The method of claim 11, wherein the replacing comprises:
converting a first setting value regarding the first function into a second setting value regarding the second function; and
replacing the execution request of the first function based on the first setting value with the execution request of the second function based on the second setting value.

13. The method of claim 12, further comprising displaying the second setting value regarding the second function on a screen.

14. The method of claim 11, further comprising:
performing a user authentication regarding authority to execute the second function in response to the execution request of the second function; and generating the execution command of the second function when the user authentication succeeds according to an authentication result.

15. The method of claim 11, further comprising:
receiving an execution result of the second function; and
converting the execution result into a format designated by the application.

16. A non-transitory computer-readable recording medium having instructions recorded thereon for controlling an image forming apparatus, the non-transitory computer-readable recording medium comprising:
instructions to receive an execution request of an application using a first function;
instructions to determine whether a first device to execute the first function is included in the image forming apparatus;
instructions to, when the first device to execute the first function is not included in the image forming apparatus, replace an execution request of the first function according to the execution request of the application with an execution request of a second function corresponding to the first function;
instructions to generate an execution command of the second function according to the execution request of the second function; and
instructions to execute the second function, by a second device included in the image forming apparatus, according to the execution command,
wherein the first function includes a camera function that is not supported by the image forming apparatus, and the second function includes a scanning function that is supported by the image forming apparatus.

* * * * *